CATHODE RAY TUBE BLANKING CIRCUIT

Filed Jan. 6, 1955

REX WILSON
HOWARD VAN JEPMOND INVENTORS 2,760,108

CATHODE RAY TUBE BLANKING CIRCUIT

Rex Wilson, Glenview, and Howard Van Jepmond, Evanston, Ill., assignors, by mesne assignments, to Hazeltine Research, Inc., Chicago, Ill., a corporation of Illinois Application January 6, 1955, Serial No. 480,079

3 Claims. (Cl. 315—22)

*General*

The present invention relates to an improved receiver circuit for television use in which the oscillator operates on low voltage D.-C. and in which mechanism is provided to blank the cathode ray tube during the beam retrace period.

In our copending application S. N. 457,724, filed September 22, 1954, entitled Cathode Ray Tube Beam Sweep Oscillator and assigned to the same assignee as the present invention, we disclose and claim an improved vertical sweep oscillator which operates at a low D.-C. voltage, such as 150 volts D.-C. As pointed out in that application, this construction makes it possible to dispense with the power transformer of the receiver, to operate the entire receiver from a single source of D.-C. voltage without step-down resistors, and to achieve other advantages. The present invention relates to the use of a sweep oscillator of this type for purposes of cathode ray tube blanking and in particular relates to a circuit in which the sweep oscillator is made to serve this blanking function without impairment of its desirable characteristics as an oscillator. This operation is achieved even though the blanking circuit is connected to the screen electrode of the oscillator tube where circuit loading would give rise to adverse effects.

It is therefore a general object of the present invention to provide an improved television receiver circuit wherein the vertical oscillator operates at low D.-C. voltage and serves to blank the cathode ray beam.

It is a more specific object of the present invention to provide a television receiver circuit wherein the vertical oscillator operates at low D.-C. voltage and in which the cathode ray beam blanking function is derived direct from the oscillator screen electrode and is achieved without loading the oscillator.

Figure 1:
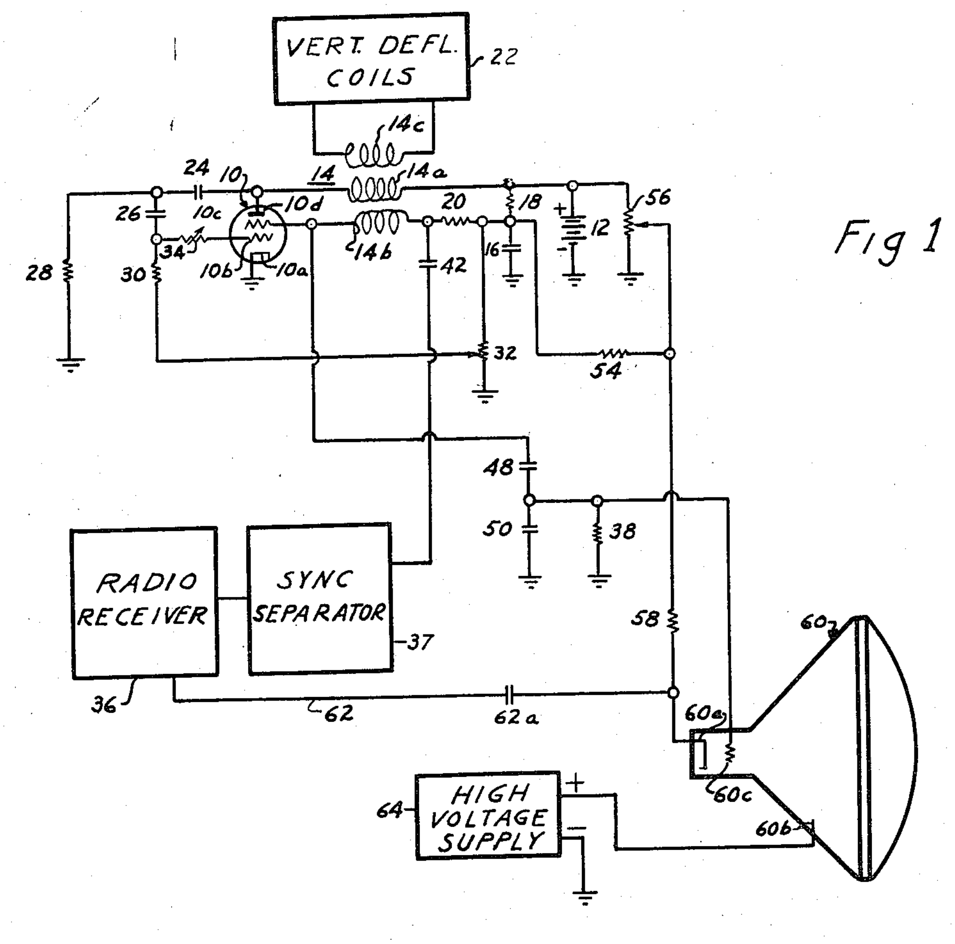
Figure 2:
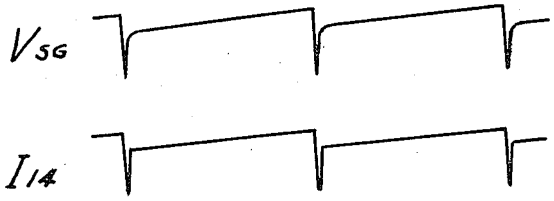

The novel features which we believe to be characteristic of the present invention are set forth with particularity in the appended claims. Our invention itself, however, both as to its organization and method of operation, together with further objects and advantages thereof, will best be understood by reference to the following description taken in conjunction with the accompanying drawing, in which:

Figure 1 is a schematic diagram—partially in block form—showing a complete television receiver constructed in accordance with the present invention; and Figure 2 is a view showing the screen electrode voltage and anode current wave forms of the vertical sweep oscillator of Figure 1.

*Description of receiver including cathode ray tube blanking circuit*

Referring now to Figure 1, there is shown at 10 an electron tube having cathode 10*a*, control electrode 10*b*, screen grid 10*c*, and anode 10*d*. This tube may, for example, be a 25L6 beam power amplifier. The anode 10*d* and the screen grid 10*c* of the tube 10 are connected to the unidirectional voltage source 12 through the windings 14*a* and 14*b* of the transformer 14, respectively. These windings are poled so that rising anode current in the positive direction in winding 14*a* gives rise to positive voltage at the screen grid 10*c*, thus forming a positive feedback system including the cathode 10*a*, the screen grid 10*c*, and the anode 10*d*.

The capacitor 16 serves to maintain constant unidirectional voltage at the source side of the windings 14*a* and 14*b*. However, resistances 18 and 20 permit some excursions from this condition at the actual winding terminals. This is important in the case of the winding 14*b* since—as hereafter described—the synchronizing wave is applied to the tube 10 through this winding.

The vertical deflection coils of the cathode ray tube—shown diagrammatically at 22—are connected to the tertiary winding 14*c* of the transformer 14. Since, as is described in detail hereafter, the current flow in windings 14*a* and 14*b* is rapidly changing, a correspondingly changing voltage wave is induced in winding 14*c* and the requisite sweep current wave flows through the vertical deflection coils. These coils straddle the neck of the cathode ray tube in usual fashion and deflect the ray beam from its axial direction of travel to an extent determined by the value of the current.

Capacitors 24 and 26, acting in conjunction with resistors 28 and 30 and potentiometer 32, form a feedback circuit from the anode 10*d* to the control grid 10*b*. This path extends through variable resistance 34. As described hereafter, this feedback path serves to swing control grid on electrode 10*b* positively and then negatively during the synchronizing voltage pulse. The capacitors thereafter discharge linearly to provide the linear ray beam sweep wave.

Negative synchronizing pulses are applied to the junction of resistance 20 and winding 14*b*. These pulses are derived from the radio receiver 36 which includes radio frequency and intermediate frequency amplifiers and demodulators as required to reproduce the amplitude modulated video and synchronizing signal components of the television carrier. The resulting composite signal is applied in conventional fashion to the sync separator 37 which discards the video components leaving a synchronizing signal containing short horizontal synchronizing pulses at a repetition rate of about 15,000 pulses per second and longer vertical synchronizing pulses at a repetition rate of 60 per second. This composite signal is applied to the junction of resistance 20 and winding 14*b* through the capacitor 42 to trigger the sweep oscillator as hereinafter described.

The potentiometer 56 is connected across the positive voltage source 12 and has its movable arm connected to the junction of resistance 18 and capacitor 16 through the resistance 54 as shown. In addition, the movable arm of this potentiometer is connected to the cathode 60*a* of the cathode ray tube 60 through resistance 58. This cathode also receives the video signal from the receiver 36 through capacitor 62*a* as shown diagrammatically by the conductor 62. A fixed accelerating potential for the cathode ray tube beam is supplied by the high voltage supply 64 which is grounded at its negative terminal and at its positive terminal is connected to the accelerating electrode 60*b* of the cathode ray tube 60.

Return sweep blanking potential is applied to the control electrode 60*c* of the cathode ray tube 60. As described in further detail hereafter, this voltage is derived directly from the screen electrode 10*c* which is connected to the cathode (ground) by the series connected capacitors 48 and 50. The control electrode 60*c* is connected to the junction of these capacitors in parallel with resistance 38. As is described in further detail hereafter, the sharp negative excursions of the wave $V_{sg}$, Figure 2, drive the control electrode 60*c* to cathode ray beam cutoff during the time the sweep current $I_{14}$ is in the ray beam return sweep stage, thereby obliterating the return sweep trace.

*Operation of blanking circuit*

The operation of the tube 10 as synchronized vertical sweep oscillator is described in detail in the above-identified copending application of the present inventors entitled "Cathode Ray Tube Beam Sweep Oscillator," S. N. 457,724 filed September 22, 1954, and assigned to the same assignee as the present invention. In brief, the negative synchronizing pulses, both horizontal and vertical, from separator 37 appear at capacitor 42. However, the horizontal pulses—with an approximately 15 kilocycle repetition rate and very short durations—do not appear at the screen grid 10c of the tube 10 because of the integrating action of the winding 14b in conjunction with the capacitors 48 and 50. The vertical pulses—with a 60 cycle repetition rate and comparatively long durations—do reach the screen grid 10c and thereby cause the sharp negative voltage swing which triggers the oscillator to execute a cycle of operation.

Once the voltage of screen grid 10c begins to fall due to the vertical synchronizing pulse, the positive feedback due to transformer 14 gives rise to an increasing screen grid voltage fall which is continued until the anode current is cut off. This action is due to the fact that the decreased anode current due to the falling screen grid voltage passes through the winding 14a. Upon anode current cutoff, the magnetic field in transformer 14 collapses at a rate determined by its natural frequency to induce a voltage in winding 14b which drives the voltage at screen 10c further in the negative direction, thus completing the positive feedback cycle and causing buildup of of the swing started by the synchronizing pulse.

The positive voltage pulse at the anode due to the anode current fall is applied to the control grid 10b through capacitors 24 and 26. However, as soon as the control electrode 10b swings positive in relation to the cathode 10a, the control electrode conducts current and thus holds its own voltage very close to the cathode potential. The capacitors 24 and 26 thus charge through the circuit extending from the anode 10d through the capacitors in series to the control grid 10b and thence to the cathode 10a. As resistance 34 is comparatively small (that is, less than a megohm) the time constant of this charging circuit is short.

It will be noted that capacitors 26 and 24 act as a capacitance voltage divider. The former may, for example, be about 0.0022 microfarad and the latter about 0.022 microfarad. Thus, capacitor 26 experiences most of the voltage rise during the period the anode 10d is swinging in the positive direction.

As the anode 10d swings positively and the screen 10c swings negatively, the ability of the screen to control the anode space current decreases until finally a point is reached wherein control is lost. At this time the voltage of anode 10d continues to swing in a positive direction due to collapsing fields and the screen voltage continues to swing in the negative direction until the collapsing fields have dissipated their energy in a half cycle of oscillation at the natural period of the circuit.

As the anode voltage swings sufficiently in the negative direction folowing this self-oscillatory half cycle, the control electrode 10b immediately partakes of the negative swing and moves negatively in relation to the cathode 10a. This is due to the fact that at this time control grid current ceases, so that the short time constant charging circuit through the control electrode 10b is discontinued. The charge on capacitors 24 and 26 accordingly does not change rapidly and the control electrode executes a rapid and large negative voltage swing.

During the negative swing of the control electrode 10b it takes control of the space current to the anode 10d. In other words, when the control electrode voltage is in the very negative region the voltage of the screen electrode 10c does not significantly affect the cathode-anode space current. At this time, therefore, the system composed of the anode 10d, transformer 14, and screen electrode 10c is no longer oscillatory and the rapid voltage swing at the anode 10d and the control electrode 10b is arrested. The voltage at screen electrode 10c accordingly tapers out from the rapid rise and rises thereafter only at a relatively slow rate.

The screen electrode voltage $V_{sg}$ is applied through the capacitor 48 to the cathode ray tube control electrode 60c. It will be noted, however, that the impedance across the screen electrode 10c and the cathode 10a is the series impedance of the capacitor 48 in series with the capacitor 50, the latter being in parallel with resistance 38 and the impedance to ground of the control electrode 60c. This impedance is comparatively great, being that of capacitor 50 in series with capacitor 48. Thus the connection of capacitor 48 and the connected elements does not load the screen electrode 10c. This is important since the triggering initial negative voltage pulse is from a rather high impedance source and in any event must be applied through the capacitor 42 and the winding 14b.

During positive ray beam sweep the alternating component of voltage at electrode 10c is nearly zero. The control electrode 60c thus sees nearly zero alternating voltage through the capacitors 48 and 50 in parallel. The voltage of the control electrode 60c is accordingly held at a fixed low-value during this time and the intensity of the ray beam is not controlled by such voltage.

In our copending application, Serial Number 471,699, filed November 29, 1954, entitled "Receiver Circuit," and assigned to the same assignee as the present invention, we describe and claim the mechanism of Figure 1 by which the intensity of the image on the cathode ray tube viewing screen may be adjusted without altering the size of the image.

In a practical receiver constructed in accordance with the circuit of Figure 1, the following circuit values were used:

| | |
|---|---|
| Tube **10** | Type 25L6. |
| Resistance **18** | 18,000 to 68,000 ohms. |
| Capacitor **16** | 10 microfarads. |
| Potentiometer **32** | 97,000 ohms. |
| Resistance **20** | 1,800 ohms. |
| Capacitor **42** | 0.22 microfarad. |
| Capacitor **48** | 0.01 microfarad. |
| Capacitor **50** | 0.022 microfarad. |
| Resistance **38** | 47,000 ohms. |
| Resistance **30** | 2.2 megohms. |
| Resistance **34** | 390,000 to 640,000 ohms. |
| Capacitor **26** | 0.0022 microfarad. |
| Capacitor **24** | 0.022 microfarad. |
| Resistance **28** | 1.8 megohms. |
| Transformer **14**: | |
| Anode winding **14a** | 10,000 ohms at 60 cycles with 10 milliamperes D.-C. current. |
| Screen winding **14b** | One third the turns of the anode winding **14a**. |
| Tertiary winding **14c** | One twenty fourth the turns of the anode winding **14a**. |
| Voltage of source **12** | 150 volts. |
| Potentiometer **56** | 50,000 ohms. |
| Resistance **54** | 150,000 ohms. |
| Resistance **58** | 220,000 ohms. |
| Cathode ray tube **60** | 21XP4. |
| Voltage of source **64** | 13 kilovolts. |

While we have shown and described a specific embodiment of the present invention it will, of course, be understood that many modifications and alternative construction may be made without departing from the spirit and scope thereof. We therefore intend by the appended claims to cover all such modifications and alternative constructions falling within their true spirit and scope.

What we claim as new and desire to secure by Letters Patent of the United States is:

1. A cathode ray tube blanking circuit comprising in combination: a cathode ray tube having a viewing screen and a control electrode; a sweep oscillator having an electron tube with cathode, control, screen and anode electrodes, elements to supply positive bias voltage to the anode electrode and screen electrode, a transformer having an anode winding interposed between said elements and the anode electrode and a screen winding interposed between said elements and the screen electrode, said windings being in positive feedback relation to define an oscillatory system including the cathode, screen, and anode electrodes, capacitor means connecting the anode and control electrodes, resistance means to discharge the capacitor means, and means to apply negative synchronizing pulses to the screen electrode through the screen winding; sweep coils coupled to the sweep oscillator and positioned to sweep the cathode ray beam over the viewing screen in accord with the anode current flow in said electron tube; a pair of capacitors in series connected between the screen electrode and the cathode electrode; and means connecting the junction of the capacitors to the control electrode of the cathode ray tube.

2. A cathode ray tube blanking circuit comprising in combination: a cathode ray tube having a cathode, control electrode, and a viewing screen; a sweep oscillator having an electron tube with cathode, control, screen and anode electrodes, means to supply positive bias voltage to the anode and screen electrodes, a transformer having an anode winding interposed between the anode and said means and a screen winding interposed between the screen electrode and said means, said windings being in feedback relation to define an oscillatory system including the cathode, screen and anode electrodes of said electron tube, capacitor means connecting the anode and control electrodes, resistance means to discharge the capacitor means, and means to apply negative synchronizing pulses to the screen electrode through the screen winding; sweep coils coupled to the sweep oscillator and positioned to sweep the cathode ray beam over the viewing screen; a pair of capacitors in series connected between the screen electrode and cathode electrode; means connecting the junction of the capacitors to the control electrode of the cathode ray tube; and means to apply video signals in negative sense to the cathode of the cathode ray tube.

3. A blanking circuit for a cathode ray tube having a brilliancy-control electrode, a viewing screen, and deflection means for the cathode ray tube comprising: a sweep oscillator having an electron tube with cathode, control, screen and anode electrodes, elements to supply positive bias voltage to said anode and screen electrodes, a transformer having an anode winding interposed between said elements and said anode electrode and a screen winding interposed between said elements and said screen electrode, said windings being in positive feedback relation to define an oscillatory system including said cathode, screen, and anode electrodes, capacitor means connecting said anode and control electrodes, resistance means to discharge said capacitor means, and means to apply negative synchronizing pulses to said screen electrode through said screen winding; means for coupling said sweep oscillator to said deflection means to sweep the cathode ray beam over the viewing screen in accordance with the anode current flow in said electron tube; a pair of capacitors in series connected between said screen electrode and said cathode electrode; and means connecting the junction of said capacitors to the brilliancy-control electrode of the cathode ray tube.

References Cited in the file of this patent

UNITED STATES PATENTS 2,552,022 Watson et al. ------------ May 8, 1951